July 8, 1958 R. W. BEYLAND 2,841,808

TRAY AND APPLICATOR FOR PHONOGRAPH RECORD TREATMENT

Filed Jan. 27, 1956

INVENTOR
ROBERT W. BEYLAND
BY John M. Cole
ATTORNEY

United States Patent Office 2,841,808

Patented July 8, 1958

2,841,808

TRAY AND APPLICATOR FOR PHONOGRAPH RECORD TREATMENT

Robert W. Beyland, Yalesville, Conn.

Application January 27, 1956, Serial No. 561,728

1 Claim. (Cl. 15—121.3)

The present invention relates to phonograph record treatment.

With the introduction of the microgroove plastic records and the reduction of surface noise, a new "noise" problem has arisen; that is, the annoying "pops" and "tricks" heard throughout the playing of the plastic records. This new noise is caused by static. There is a definite static build-up in the record caused by the motion of the record past the needle. Dust and record debris help to hasten this static build-up. When the static "charge" is released through the needle, a very definite "pop" or "tick" is heard through the reproducing equipment. Because the level of the surface noise is lower on the newer types of records, these sudden and intermittent "pops" seem quite loud and are very noticeable when they occur.

A microscopic study to find what happens to this groove as the needle passed along the groove when the record was in motion showed that the records examined were dirty. This dirt was in the form of dust, lint, fine particles of the record material, minute metallic particles, and other particles under the general heading of debris. The quality and quantity of this debris followed a very definite pattern.

The new records were found to have considerable surface lint and some debris in the grooves. Records that had only been played two or three times were reasonably clean. Surface and groove debris became increasingly heavier in proportion to the number of times the record had been played. From this investigation it was quite evident that record debris was the prime cause of surface noise and static. It was also quite evident that the debris was accelerating record wear. This debris was acting as a grinding compound and literally wearing out the record groove, and in other cases flattening and smoothing the groove. Even though a record may be clean, it was still found that there was some inherent static present in the record because of its material and the "rubbing" action of the needle in the groove.

The present invention contemplates the provision of new and improved apparatus for the treatment of phonograph records to clean them, reduce static noises produced when they are played, and to increase the useful life of the record.

According to the present invention, a record cleaner solution preferably a dilute aqueous solution of mono-oleosorbitan is applied to the playing surface of the record by an applicator. A convenient kit for the purpose includes a bottle of liquid, a tray in which a small amount of the liquid can be poured, and an applicator. The tray is so made that the sponge part of the applicator can be wetted with the liquid, then pressed against the fins above the liquid level to remove excess liquid, and then rubbed on the surface of the record to remove dirt and lint and leave a very thin coating of the non-volatile component of the liquid.

The accompanying drawings illustrate a kit, the component parts employed therein, and the mode of application of the liquid to the phonograph record.

Figures 1, 2:
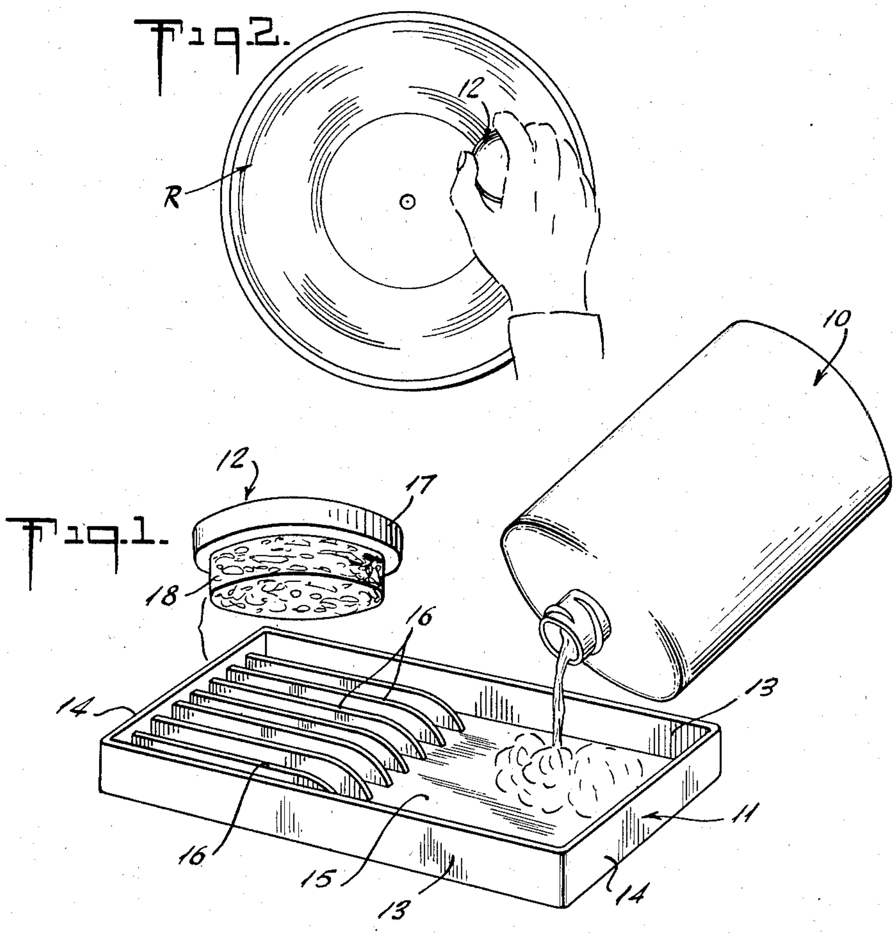
Figure 1 is a perspective view illustrating the kit.
Figure 2 is a view illustrating the use of the applicator on a phonograph record.
Figure 3:
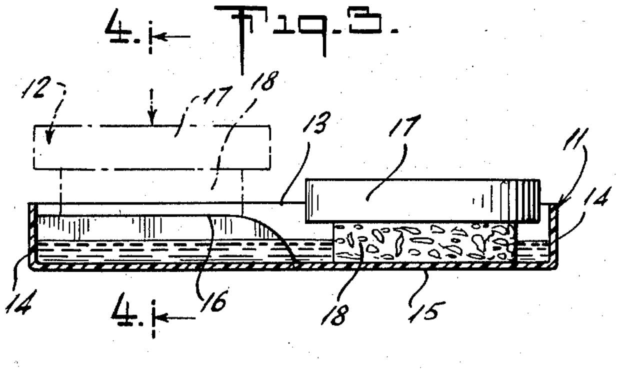
Figure 3 is a longitudinal sectional view through the the tray showing the applicator in two positions.

In the drawing a small bottle adapted to contain the solution of polyoxylene sorbitan mono-oleate (known also as "Tween 81") is indicated at 10, a tray at 11, and an applicator at 12. The tray may conveniently be a shallow, rectangular box with side walls 13—13 and end walls 14—14 and a bottom 15.

One end of the tray 11 has a number of risers 16 between which are grooves which open into the other end of the tray. The tray can conveniently be approximately 2″ x 4″, ⅜″ deep. The applicator has a rigid button 17 to which is secured a disk of cellulose sponge 18. This material is very soft when wet and will not scratch or abrade the record.

Figure 4:
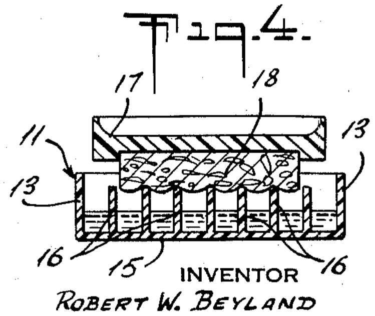
Figure 4 is a vertical cross sectional vew on the line 4—4 of Figure 3, showing the applicator pressed against the fins.

When one wishes to use the cleaner, a quantity of the liquid is poured from the bottle into the tray, the applicator wetted by dipping the sponge into the liquid, and then the excess liquid in the sponge is removed by pressing the sponge against the fins as indicated in Figure 4. The applicator is then rubbed over the surface of the record as indicated in Figure 2. The unused fluid in the tray can be poured back into the bottle and saved for further use.

The material used is completely stable, inert and safe for the user. Clinical tests have shown that it causes no irritation whatever.

Using this solution on new records maintains their newness over a long period of time and does much to restore the quality of used records as it has been established that groove debris is the major cause of surface noise and record wear. Because of this, eliminating the static is only part of record care. The record should be properly and adequately cleaned and lubricated before each play. This will remove the surface lint and dust picked up from the storage envelope and restore the lubricating film to the grooves, helping to prevent further wear. Used records will need several plays and applications before all of the groove debris has been removed and the record restored to a clean condition.

Evidence of groove debris in new and used records is very apparent from the residue that is collected on the needle. When using this solution for the first time on any record, new or used, attention should be given to the needle. This residue build-up on the needle can be very rapid. This residue build-up can become so heavy on the needle that distortion of the reproduced sound will occur. Once the records have become clean and all groove debris has been removed by repeated cleaning and playing, this build-up no longer occurs. Further groove wear caused by the needle is alleviated by the lubricating properties of the solution.

For proper care, all records, new or used, should be thoroughly cleaned and lubricated before each play to remove any surface debris and to lubricate the grooves to prevent needle wear and abrasion.

This solution will maintain the newness of new records and help to restore some of the newness to old records by allowing the needle to ride in the true groove of the record and not a "false" groove caused by debris in and on the sides of the grooves.

What is claimed is:

A device for use in applying a cleaning and treating liquid to phonograph records comprising a shallow rectangular tray having a bottom and four side walls, a plurality of spaced riser fins in one end of said tray, each fin extending from the bottom to a plane parallel to the bottom and slightly below the upper edges of said walls, the bottom portion of the other end of said tray being smooth and unimpeded, the spaces between said fins communicating one with the others and the other end of said tray, a disc-shaped applicator sponge having a flat lower work face of an area smaller than the other end of said tray for insertion therein to soak up a quantity of liquid retained in said tray and a thin peripherally gripped handle member superimposed on and conected to said sponge for manipulation thereof, the size of said sponge being coordinated with the spacing of said fins so that upon inserting said sponge in the tray to soak up liquid and then depressing the sponge on the top edges of the fins to eject a portion of the liquid, sufficient liquid will be retained in the sponge for coating a record to be treated.

References Cited in the file of this patent

UNITED STATES PATENTS

| | | |
|---|---|---|
| 227,117 | Liebmann | May 4, 1880 |
| 935,420 | Smith | Sept. 28, 1909 |
| 1,822,487 | Hill | Sept. 8, 1931 |
| 2,204,190 | Siegel | June 11, 1940 |
| 2,255,091 | Vaughn | Sept. 9, 1941 |
| 2,393,863 | Myers | Jan. 29, 1946 |
| 2,659,917 | Drum | Nov. 24, 1953 |
| 2,670,308 | Groff | Feb. 23, 1954 |
| 2,680,080 | Eisen | June 1, 1954 |

FOREIGN PATENTS

| | | |
|---|---|---|
| 27,444 | Great Britain | Nov. 25, 1910 |
| 740,012 | Great Britain | Nov. 9, 1955 |

OTHER REFERENCES

Wireless Word, January 1955, "The Dust Problem," pp. 27 and 28.